(12) United States Patent
Hummelholm et al.

(10) Patent No.: US 8,606,320 B2
(45) Date of Patent: Dec. 10, 2013

(54) INTELLIGENT BASE STATION COMPRISING FUNCTIONS RELEVANT TO ITS OPERATION

(75) Inventors: Aarne Hummelholm, Riihimäki (FI); Kari Innala, Itäsalmi (FI)

(73) Assignee: Tele-Entre Oy, Helsinki (FI)

( * ) Notice: Subject to any disclaimer, the term of this patent is extended or adjusted under 35 U.S.C. 154(b) by 519 days.

(21) Appl. No.: 11/667,124

(22) PCT Filed: Oct. 21, 2005

(86) PCT No.: PCT/FI2005/050370
§ 371 (c)(1),
(2), (4) Date: May 7, 2007

(87) PCT Pub. No.: WO2006/053943
PCT Pub. Date: May 26, 2006

(65) Prior Publication Data
US 2008/0130614 A1 Jun. 5, 2008

(30) Foreign Application Priority Data
Nov. 17, 2004 (FI) ...................................... 20041481

(51) Int. Cl.
*H04M 15/00* (2006.01)
(52) U.S. Cl.
USPC ........ 455/561; 455/560; 455/432.2; 455/450; 370/328; 370/338; 370/343; 370/310
(58) Field of Classification Search
USPC ........... 455/432.3, 447, 450–452.1, 453, 509, 455/552.1, 553.1, 561; 370/335, 342, 261, 370/318; 375/E1.021, 144, 146, 148
See application file for complete search history.

(56) References Cited

U.S. PATENT DOCUMENTS 5,623,495 A * 4/1997 Eng et al. ...................... 370/397
5,657,375 A 8/1997 Connolly et al.
(Continued)

FOREIGN PATENT DOCUMENTS

EP 1 347 583 A2 9/2003
WO WO 01/74017 A1 10/2001
(Continued)

OTHER PUBLICATIONS

Albena Mihovska et al., "A Novel Flexible Technology for Intelligent Base Station Architecture Support for 4G Systems", Wireless Personal Multimedia Communications, 2002, The 5th International Symposium on Oct. 27-30, 2002.

(Continued)

*Primary Examiner* — Mahendra Patel
(74) *Attorney, Agent, or Firm* — Buchanan Ingersoll & Rooney PC

(57) ABSTRACT

The object of the invention is a mobile station network and a base station used therein. According to the invention an intelligent base station is realized. Each base station functions independently and comprises the all the important functions relevant to its operation in it. The base station according to the invention is built so that all the data transmission, transfer and control functions are included in it, preferably the at least channel levels in the base station are replaced. The advantage with an intelligent base station is that it has a limited number of necessary functions, but at the same time expanding features, like outer interfaces, can easily be added.

20 Claims, 1 Drawing Sheet

(56) References Cited

U.S. PATENT DOCUMENTS

| | | |
|---|---|---|
| 6,188,898 B1 | 2/2001 | Phillips |
| 6,205,133 B1 * | 3/2001 | Bexten .......................... 370/343 |
| 6,975,879 B1 * | 12/2005 | Aalto et al. ................... 455/522 |
| 7,509,417 B1 * | 3/2009 | Kammer et al. ............. 709/225 |
| 7,539,158 B2 * | 5/2009 | Pan ................................ 370/328 |
| 7,738,886 B1 * | 6/2010 | Connolly et al. ............. 455/461 |
| 2003/0008632 A1 * | 1/2003 | Menon et al. ................. 455/403 |
| 2003/0092423 A1 * | 5/2003 | Boivin .......................... 455/410 |
| 2003/0202485 A1 * | 10/2003 | Mansfield ..................... 370/328 |
| 2003/0203717 A1 * | 10/2003 | Chuprun et al. ............. 455/12.1 |
| 2003/0233538 A1 | 12/2003 | Dutertre |
| 2004/0013128 A1 | 1/2004 | Moreton et al. |
| 2004/0204097 A1 * | 10/2004 | Scheinert et al. ............. 455/561 |
| 2008/0004076 A1 * | 1/2008 | Adachi et al. ................ 455/560 |

FOREIGN PATENT DOCUMENTS

| | | |
|---|---|---|
| WO | WO 01/91480 A1 | 11/2001 |
| WO | WO 02/087098 A1 | 10/2002 |

OTHER PUBLICATIONS

Fabio Chiussi et al., "Mobility Management in Third-Generation All-IP Networks", IEEE Communications Magazine, Sep. 2002, pp. 124-135.

* cited by examiner

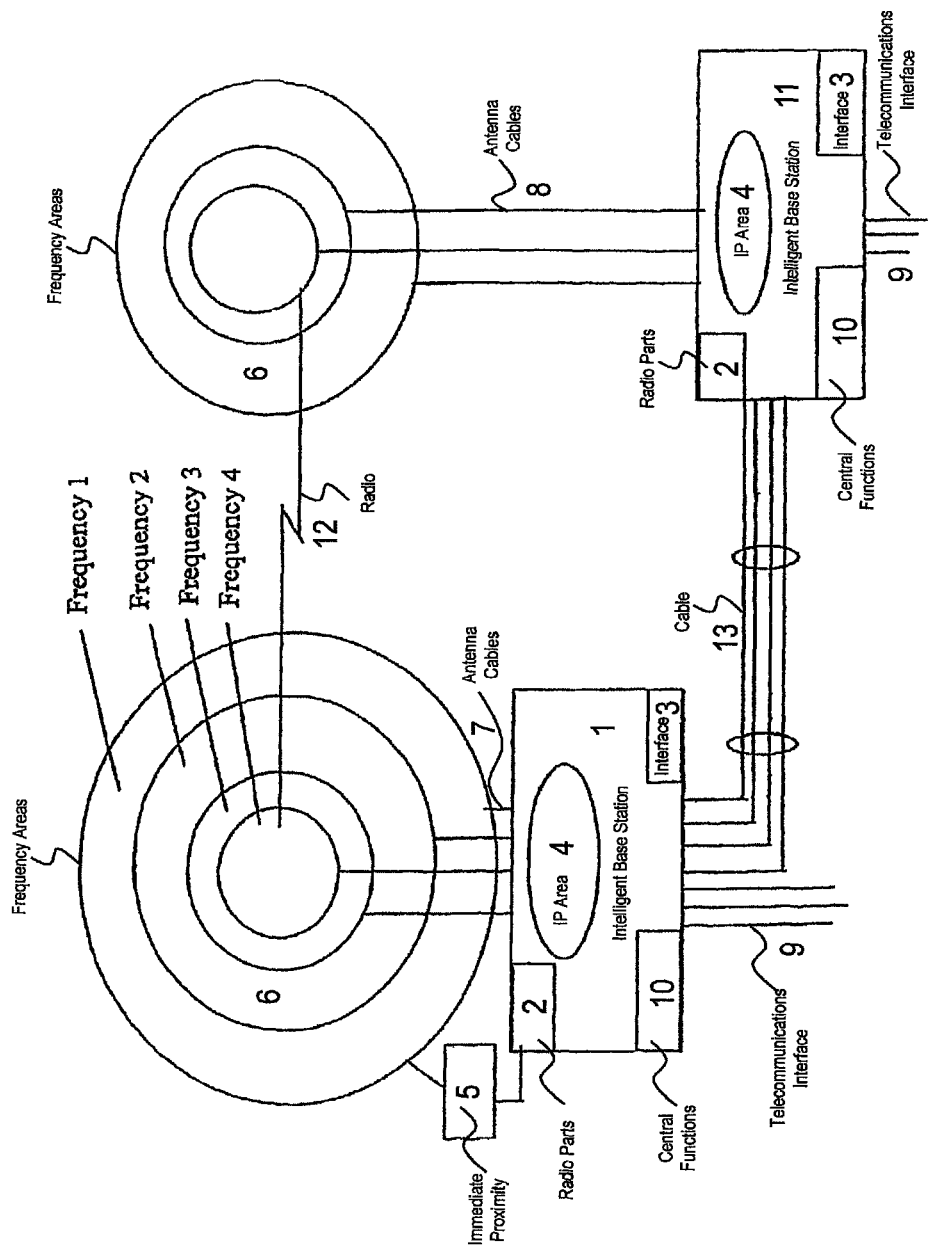

INTELLIGENT BASE STATION COMPRISING FUNCTIONS RELEVANT TO ITS OPERATION

This application claims the priority benefit and is a national stage entry of PCT Application No. PCT/FI2005/050370, filed Oct. 21, 2005, for "Intelligent Base Station Comprising All Functions Relevant to Its Operation," by Aarne Hummelholm et al.

FIELD OF THE INVENTION

The object of the invention is a communications network and a base station for use in the network.

BACKGROUND

A mobile station network is a telephone network that is based on radio-techniques, that consists of radio-base stations and radio and wire connections between the base stations, and terminals and mobile stations centrals and services contained in the centrals. A base station is in such a mobile phone network a component to which, the mobile connects when in use. These base stations are connected to each other either by radio link or by a wired network. The terminal device is for example a mobile phone, which is a portable phone terminal using radio communication. Technically the mobile phone may be a phone using e.g. GSM or GPRS-techniques. The mobile station central on the other hand is a phone switch, that directs the phone terminal device to the right channel for receiving a call. Mobile communications is then wireless communication between the telecommunications network (base stations) and the terminal devices (mobile phones) by using terminal devises utilizing radio communications.

When the user makes a call or sends a message with his mobile phone, the message is first transformed to digital form and is then transferred wirelessly over radio frequencies, usually to the nearest base station. The base station contains cells that form the coverage area of the base station. The form of the cell is determined by in which direction and at which height the antenna of the transceiver unit on the base station is installed and in what kind of terrain the base station is situated. Typically the antennas of the base stations tend to be placed as high as possible in the countryside and at the roofs and walls of buildings in cities. This way geographical obstructions hinder the course of the radio signal, i.e. the wireless transmission of the call or the message, as little as possible.

Today mobile phone networks are based on cell systems, where transmission power is not increased in order to expand the coverage area, but the operation is based on reuse of the frequencies. The same frequency is used in many places, which are though at sufficient distances from each other, not to interfere with one another's transmissions. There is at least one transceiver a cell of a base station. The mobile phone network also comprises a base station controller, which controls the traffic of the base stations, i.e. forming of, or ending calls or data connections, signaling and the use of radio frequencies. There are several base stations in the range of one controller. From the base station the call or message goes to the mobile station central, which relays the call or message from the mobile station network to another or to other telecommunications networks. If the call ends up at another mobile station, the message travels the last part wirelessly via radio frequencies. Such a telecommunications distance for a call from a phone to another is thus very long and complex, even though the call makes the distance in a fraction of a second.

The GSM-network is for example not closed, but it has connections also to the world outside the network. The GSM-network can though, be divided into parts according to how it is connected to this external world. This kind of division takes place by means of the inner structure of the GSM-network and its connections to the outer world. Connection of the users' mobile phones to the GSM-network takes place through the base station subsystem (BSS). The operator monitors and controls the network with the administration subsystem (OSS) and the connection of the GSM-network to other networks and the connection of the network is a task of the network and connection subsystem (NSS).

The BSS is responsible for the radio path control and its task is to connect the mobile phones to the mobile phone central. The BSS is further divided into two parts, i.e. to base stations (3TS) and base station controllers (3SC). The base stations comprise needed transmission and receiving devices, to enable a signal to travel from the mobile phone to the GSM-network over radio paths. The base stations are the core of the cell network, since every base station form a cell of its own. The control of the radio paths is centralized in the base station controllers, which can control several base stations. Main tasks of the base station controllers are among others reserving and freeing radio channels and controlling the handover of the base stations.

The most essential component of the NSS is the mobile station central (MSC), which is responsible for connection of the calls inside the GSM-network and between the GSM-network and external networks. In principle, the functionality of the MSC largely corresponds to the functionality of the central in the fixed network, since in the same way it connects the time slots of the incoming PCM (pulse code modulation)-connections to the time slots of the outgoing PCM-connections as the central in the fixed network. In order to be able to connect calls to mobile stations, the central needs to know where the mobile station in question is situated at that time. This information is saved in the common home location register (HLR) for all the centrals. HLR is a database where, additionally to common subscriber information also information about the approximate position of a single mobile station is maintained. More exact information on the position is saved in the MSC-specific visitor location register (VRL). The VLR is responsible for temporary saving of the position information for the subscribers on the service area of each of the MSC's. There can be several mobile station centrals in a mobile station network. Since an outside caller does not have information on in the area of which central the mobile station is at a given moment, the call has to be routed into the mobile station network without any kind of position information. This task, of receiving calls coming from other networks, is performed by the gateway mobile services switching centre (GMSC). The GMSC thereafter attends to that the call is directed to the right mobile station.

OSS takes care of that the mobile station network operator is capable of controlling its own network. The OSS assembles the different parts of the mobile station network to one controllable unit. The control procedures can be divided into bug control, configuration control, billing control, performance control and security control. The OSS offers different possibilities for management of all these sectors.

GSM then allows connecting of different voice and data services and operations between networks. GSM has defined three different services: network, tele- and support services. The mobile station is connected to the GSM PLMN (infrastructure needed by the GSM) network through an interface. The network is connected to transfer networks, for example to an ISDN or a traditional PSTN. There can further be some additional network in between (source or target network) before a station forms a connection. The network service gathers all services, which enable transparent data transfer via the interfaces to the network. If interfaces have not been determined for all networks, the network determines which interfaces can be used in transparent data transfer. In the traditional GSM-model network services are connectable and circuit and packet switched. These services require only the three is lowest levels of the ISO/OSI-model. In the mobile station, the mobile terminal performs all the network specific tasks (e.g. TDMA, FDMA and coding) and provides an interface for data transfer to another terminal, which can be independent of the network. Depending of the capabilities of the other terminal, other interfaces may be needed. Tele services are application specific and may thus need all of the layers in the ISO/OSI-model. Those services are defined from point to point i.e. from one terminal to another.

GSM defines many different mechanisms for data transfer. Network services allow transparent and non-transparent and synchronized and non-synchronized data transfer. The transparent network services use only the functions of the physical layer for sending data. The data transfer has, in other words a constant delay and transit, if no transfer errors occur. The only way to improve the quality of the transmission is to use FEC-correction, which codes a repetition into the data flow and helps reforming of the original data in case of a transfer error. Transparent network services do not try to restore lost data, in the case of for example shading or an interruption occurring while change of base station. Non-transparent network services use the protocols of layers 2 and 3 in order to be capable of carrying out corrections and flow control. These services use transparent network services, to which they add the radio link protocol (RLP). There are many network services defined by transparent and non-transparent services in GSM, which are used with the PSTN, ISDN and packet switched public networks, such as the X.25 that is used all over the world. The data transfer can be full duplex and synchronous on data transfer rates of 1.2, 2.4, 4.8, 9.6 kb/s or fill duplex and asynchronous on rates of 300-9600 b/s.

GSM focuses mainly on voice centered telecommunication services. They are transmission of encrypted sounds, message services and basic data transmission, which is known already from PSTN and ISDN. Since the main service is still the phone, the main object was to produce high quality digital voice transmission and to offer at least the same bandwidth of 3.1 kHz as the normal analogue phone systems. For this task, specially designed coders and decoders are used for the voice transmission, while other coders are used for analogue transmission for traditional computers.

Additionally to network services the GSM service providers may offer other support services. According to ISDN networks these services in many ways improve common phone services. The offered services may vary from one service provider to another. Typical services are user identification and directing of calls i.e. rerouting of incoming calls. Further ISDN-features are available, such as closed user groups and conferences with several attendants.

GSM is a hierarchical and complex system architecture with many units and interfaces. The GSM-system is thus formed by three subsystems: the RSS, Radio SubSystem, the NSS, Network and Switching SubSystem, and the OSS, Operation SubSystem. Usually the user notices only a small part of the whole network, i.e. the mobile stations and some of the base station transmitter antenna masts.

RSS or the Radio SubSystem is formed by the units linked to radio, i.e. the mobile stations and base stations. The GSM-network is formed by many subsystems of base stations, each controlled by a base station controller. The base station carries out all maintenance functions of the radio connections of the base stations, codes and decodes sounds and adapts the speed to the wireless part of the network and vice versa. Additionally to the base station controller the base station comprises several transmission/receiver units of the base station. The transmission/receiver unit of the base station is formed by all the devices needed for radio transmission: antennas, signal processors and amplifiers. The unit can form a radio cell, or using directional antennas, several radio cells. It is connected to the mobile station via a first interface and to the base station controller via a second interface. The first interface comprises all the mechanisms needed in wireless transmissions (TDMA, FDMA etc). The second interface is formed by 16 or 64 kb/s connections. A GSM cell can be in size range 100 m-35 km depending of the surroundings and the expected traffic. The base station controller in fact controls the trans mission/receiver units of the base station. It reserves radio frequencies, handles the exchange of the transmission/receiver units in the base station and implements the searches made by the mobile stations. The base station controller also channels the radio channels to fixed network connections at the interface. A mobile station is formed by the user's all devices and programs needed for communication in a GSM-network. A mobile station is formed by all the user's devices and programs and the subscriber's identification module, i.e. the SIM-card, onto which all the user specific data is saved. User specific mechanisms, like charge and verification, are based on the SIM-card and not on the actual device. Device specific mechanisms like theft inhibition, use device specific identifiers.

NSS i.e. the network and the switching central for calls is the core of the GSM-system. NSS connects the wireless network to standardized public networks, switches base stations, comprises functions for globally locating users and supports charging of the users, collecting of chargeable events and roaming of operators all over the world. The NSS is formed by switching centrals and databases. The switching centrals for mobile services are very efficient ISDN-switching centrals, which form connections to other mobile phone centrals and base station control centrals through an interface. These centrals form the fixed main trunk of the GSM-system. Usually, the mobile phone central administers several of the base station control centrals in the same area. The Gate Way mobile phone central has additional connections to other fixed networks, like the PSTN and ISDN-networks. Using conciliation measures the mobile phone central can also connect to public telecommunications networks, such as the X.25-network. The mobile phone central provides for all the needed signaling, disconnecting of the connection and assignment to other mobile phone centrals. The mobile phone central also performs all the functions of additional services, such as forward direction of calls, phone conferences with several attendants and collect calls. The home register is the most important database in the GSM-system, because all the essential information of the users is stored therein. They are static data, such as the ISDN-number of the mobile subscriber, subscribed services and the verification key. Further, dynamic data is needed, for example the current position of the mobile station. Immediately when the mobile station moves from its current position area, the information is saved in the home register. All user specific data occur only once in the individual home register, which also supports charging and gathering of chargeable events. The visitor register of the mobile phone central is a very dynamic database. All needed information on the users of the mobile stations, which are currently on the position area of the mobile phone central, is stored therein. If a new mobile station enters the position area, of which the visitor register is responsible, it copies the needed information on the user from the home register. Due to this visitor and home register hierarchy, it is not necessary to continuously update the home register, and no long distance transmission of user information is needed.

The third part of the GSM-system, i.e. the operation and maintenance central (OSS) comprises all functions relating to the function and maintenance of the network. OSS controls its own sections of the network and handles other sections with SS7-signalling. OSS comprises the administration central, verification central and the device register. The administration central observes and controls all other parts of the network through an interface. Common service functions are tracing of traffic, status reports of the network parts, control of the subscribers and safety and gathering of chargeable events and charging. The administrative centrals use a standardized telecommunications administration network. The verification central is determined since the radio interface and the mobile stations are very vulnerable, and for user identifying and for protection of data transfer. The verification central has algorithms for verification and keys for encryption. The verification central creates the values that need verification from the user in the home register. The verification central can in principle be situated in an especially protected part of the home register. The device register is a database for all the IMEI-identifiers. It contains identifiers for devices registered in the network.

TETRA is a GSM-like digital network closed from the general public. The up-to-date features of the system ensure, in addition to a high data security high quality speech and data characteristics. TETRA functions according to the principle known from trunking networks. Thus the network's resources are available to all groups connected to the network. Additionally the TETRA-terminals support direct mode (DM), so no network is needed on this connection interval. The latter practice reminds of a type of LA-type call, even though TETRA enables for example very good protection against outside listeners.

TETRA is like GSM based on TDMA-techniques (Time Division Multiple Access). The TETRA-frequencies are divided into frames formed by four intervals, which are repeated according to the same principle as in GSM. Using TETRA the sending party has to push a button in the device to be able to transmit in half-duplex.

The frequency period is 25 kilohertz in TETRA, while it is 200 kilohertz in GSM. As modulation technique TETRA uses DQPSK (Differential Quadrature Phase Shift Keying). The rate of speech coding is 7.2 kilo bits per second including error correction. The speech service can be used as half duplex or full duplex, depending on the situation.

The interface of TETRA is named AI (Air Interface). Radio interface may be used either between the mobile station and the network or in direct connections between mobile stations. The interface between the TETRA-base stations and centrals can be implemented with a 64 kilobit per second PCM transmission that is known from GSM, thus so that single channels of the radio interface are under multiplexed into 8 kilobit blocks per second. The capacity between the base station and the central can thus in principle be used two times more efficiently compared to the 16 kilobits under multiplexed blocks of the Abis interface in GSM.

When a TETRA-connection is formed between the user and the network, a user identification and encryption if the interface is performed according to very similar principles as in GSM. The difference from GSM is additionally to the difference in identification and encryption algorithms are that the TETRA network offers the possibility of mutual authentication. Thus the user of the terminal device can ensure that he uses an authentic TETRA network. When two TETRA networks are connected to each other, the Inter-System Interface (ISI) is used. Thus TETRA offers in principle a possibility also a type of network roaming, just like in public GSM-networks. It is possible to connect external devices to the TETRA-stations, for example computers and terminals through the Peripheral Equipment Interface (PEI). The terminals enable among other things data transmission between the devices and the network.

An important element of the TETRA-network is a so-called service central. This means a place, where the messages are physically received. The service central is connected to the central system either directly or through a separate transit network (PSTN, ISDN, PDN, or the like). The interface of the service central is named LSI (Line station Interface).

Also connections to outside networks are defined in the TETRA-system, such as the public switched telephone network (PSTN), the ISDN-network or a packet switched network (PDN, Packet Data Network). As in GSM, a separate network control element is needed in TETRA for maintenance and control that is connected through the NMI-interface (Network Management Interface) to the central system. This is the only optional interface in TETRA. It is possible to connect to the network management for example via a separate terminal.

A TETRA call can be formed either through the network or directly between the users (Direct Mode). The latter means in practice that at least two users can form a connection directly between their terminal devices thus that the network is not in any kind of connection to the users. According to the Direct Mode, the sender and receiver have in communication one common frequency in use, on the time slots of which the direction of sending and receiving is alternated. In a single time slot of TETRA the sending party is a so-called master and the receiving party is a slave. In a normal TETRA emission two pieces of time slots of a singe frequency for each transfer direction can be used. A special frequency efficient mode is also defined in TETRA, where for each single frequency two duplex calls can be transmitted.

Direct mode is usefull especially when the coverage area of the normal trunking-network is missing or the signal strength of the network is weak. On the other hand direct mode frees capacity to the network, so the function can be used also in a kind of load distribution. All in all direct mode is such that the connections are formed at a single frequency and locally, unlike when communication occurs through the network.

In data transmission exactly the same principles are used in TETRA as in the HSCSD (High Speed Circuit Switched Data) or GPRS (General Packet Radio Service) in GSM, i.e. there is a data transmission of variable rate according to the used channel coding and the number of time slots. For parallel time slots the term multi slot can also be used in TETRA.

Data transmission in TETRA can be implemented with so called Bandwidth on Demand. When needed more capacity than normally can be given to a single terminal for example for the time of the transmission and receiving of information including pictures. Additionally to circuit switched data transmission packet switched connections (connectionless and connected X.25-communication) is defined in TETRA. TETRA also supports protocols IPv4 and IPv6. In packet switched mode outside packet switched networks see TETRA in the same way as any other IP-sub network or X.25-node.

Automatic handover is defined in TETRA according to the same principles as in other modern cell networks. Because of this trunking-connections can continue even though that the signal strength of original node used in the beginning of the connection turns insufficient.

Like GSM TETRA has channels and separate control channels (for confirmation of access, allocation of traffic channels and control of traffic channels) reserved for the data transfer of the radio interface. The traffic channels can be used so that the users of priority can access the system before the users of lower priority. The priority function can be used also so that already existing calls may be interrupted in order to allow a call of higher priority to enter the system. In the priority function the specifications are though left to be implemented to the device manufacturers for example when it comes to the priority between data and speech traffic.

SUMMARY OF THE INVENTION

There are two telecommunications systems described by examples above. Even though the telecommunications networks evolve rapidly, several problems do occur in the functions of the networks in practice. Problems that the invention at hand deals with, are among others, the load on the network, frequency division problems, fast recognition, encryption to a mobile user, uninterrupted noise-free connection, fast roaming between different radio systems, reliable network, good coverage in difficult conditions, immunity to disturbances, capacity control and problems relating to maintenance and operation. Additionally the invention offers a very cost efficient entity.

The aim of the invention is to produce a telecommunications network and such a base station that works efficiently and reliably. According to the invention the SDH-nodes, PDH-nodes and networks of a conventional mobile station network; the networks built by SDH-nodes; are replaced, with needed networks and partly functions of the mobile station networks with new base station structures in order to provide the user with the needed communications services.

According to the invention this goal is achieved by an intelligent base station. Each base station thus functions independently and comprises all functions essential to its functionality. The base station according to the invention is thus built so that it comprises transmission, switching and control and monitoring services and services relating to data security. An advantage with intelligent base stations is that the number of necessary functions is limited, but at the same time it is easy to increase the number of broadening extending functions, such as for example outer interfaces.

The base station according to the present invention functions so that it has the functions corresponding to those of BSS and NSS built in. Differently to prior known physical structures, the function of these is implementeded based on IP. The functions of earlier used protocols can according to the invention be changed to function with the IP-protocol or to partly function with other modern protocols.

When functions are added to an intelligent base station, the functions comprising transmission and receiving of data, pictures (including moving pictures), text and speech, channeling of radio systems, ensuring of data security and control and monitoring of the network, it is possible to achieve a functioning base station solution according to the invention. Preferably no separate error correction systems of the transmission path are then needed, because the transmission path is limited between the intelligent base station and the terminal device. It is not necessary to pay attention to transmission path errors since there is no separate transmission system.

Conventionally the data transmission rate is limited very much by the operation of the network. According to the invention now at hand, very high data transmission rates can be achieved since no broad network based on different systems is necessarily needed after the base station. According to the invention the data services do not only exist, but they are much faster than those known from the prior art.

According to the invention all the important functions are gathered in the same base station so that important functions relating to that occurring in the prior art can be left out as being unnecessary. For a person skilled in the art it is evident that many normal functions can be added as extras to a telecommunications network according to the invention now at hand.

According to the invention at hand the intelligent base station comprises more functions than a conventional traditional base station, but at the same time the intelligent base station comprises less functions than a conventional traditional mobile station system. However, enabling exactly the same services as previously known mobile phone systems, just more rapidly and safely. These functions are achieved by placing radio connection, switching, maintenance, and supervision services and services relating to data security, in the intelligent base station according to the invention.

A preferable application for this new type of base station could be in for example GSM-, TETRA-, Wi-Fi- and WiMAX-systems and the like. This list is not exhaustive, but it is meant to show that the invention can be used also in such a way that the same base station can function with several systems. Preferably the invention can be used so that the same base station can work with several systems. I.e. it is not necessary to builds separate base stations for different systems.

With the help of this invention, limited implementations of some of these systems are possible in such a way that outside users cannot enter the network at all. Also combinations of these different systems are possible. Preferably, users outside a certain user group do not have an interface in the telecommunications system according to the invention. Naturally such an interface can be provided, when the telecommunications network according to the invention will have a connection to, for example, a traditional telecommunications network. A connection to the telecommunications network can be provided for example with copper or fiber connections, whereat traditional interfaces and telecommunication protocols can be used additionally to the transmission rate of the network at hand. Conversion techniques are found in the intelligent base station.

Preferably a base station according to the invention can be duplicated into the environment in such a way that many identical base stations are placed in the area, when the base stations are as though divided into several pieces.

In the following, a description of the function of the invention by given means of an example. A network is built in a certain area so, that several base station masts are erected in the environment. Each base station mast comprises an identical intelligent base station. Preferably, the intelligent base station is placed at the top of the mast, so that the transmission path, commonly a cable, between the antenna and the intelligent base station is as short as possible. The intelligent base station can naturally be placed also for example at the foot of the base station, but then the transmission path to the antennas of the base station is a bit longer and the increased attenuation causes an substantial decrease of the length of the connection distance. Compared to the traditional design, where each function of the mobile station system is physically located in different devices at very long distances, the design according to the invention has the advantage that all necessary functions are situated substantially in the same area Preferably in the same physical device.

When a new terminal device enters the operation area of such an intelligent base station, e.g. a Wi-Fi-terminal device the intelligent base station receives information about this appearance in the conventional way. The intelligent base station then shares this information with the other intelligent base stations in the area. When another terminal in the area whishes to make a connection to this new terminal device in the same area, the terminal device wanting to create the connection contacts the closest intelligent base station, or preferably the base station with the highest capacity, then this intelligent base station can immediately connect the call or service to the desired terminal device. Thus the service or call request need not to travel the long way to a mobile phone central, as the functions of the central are now situated in every intelligent base station.

The base station system according to the invention can be attached also to conventional networks through interfaces. In this case, if a terminal device in the area of an intelligent base station network wishes to contact a terminal device outside the network, the terminal device contacts a suitable intelligent base station, from where the connection request goes to the nearest, or most appropriate, traditional network through the interface, and continues from there by known means. In the opposite case, a connection request coming from the outside to a terminal device on the area of an intelligent base station network, takes place at the transmission end in the conventional way, and when the connection request enters the area of the intelligent base station network through the most suited interface, the intelligent base station receiving from the interface is itself capable of directing the connection request to the desired terminal device.

BRIEF DESCRIPTION OF THE DRAWINGS

The invention is more closely described by reference to the accompanying FIGURE, where the basic architecture of the mobile station network according to the invention is described.

DETAILED DESCRIPTION

In FIG. 1 two intelligent base stations 1, 11 are described by example. In this example the intelligent base station 1, 11 comprise the radio parts 2 (e.g. TETRA, GSM, Wi-Fi, or the like) of the base station. These radio parts work as transceiver parts of the intelligent base station. Such a radio part is situated either physically in the intelligent base station or out side it in the immediate proximity 5 of it. If the power needed by the radio part is sufficiently small and it thus does not produce plenty of heat (for example Wi-Fi), it can be situated in the same physical device as the intelligent base station 2. If again the power demand is big and a lot of heat is created (for example TETRA) the radio parts are placed outside the intelligent base station, preferably in the immediate proximity 5. The radio functions of the radio parts, the needed digital signal processing, and adaptation to transmission and telecommunications networks can be situated inside the intelligent base station 2. According to the invention the intelligent base station has the central functions 10, connected through the needed telecommunications interface 9 to different radio systems and for example to traditional telecommunications networks. This way it is possible to form independently functioning local, regional or nationally functional network entities, from which connections to other networks can be formed when needed.

The functions in base stations 1 and 11 are, as a rule, software-implemented. The functions of the base station may preferably in a slightly limited form be situated also in the terminal device (not in the FIGURE), whereat the terminal devices can replace the base stations and communicate with each other. In this case the terminal device preferably has a part of or all the base station functions.

In the FIGURE the first intelligent base station 1 according to the invention is connected to a second intelligent base station 11 according to the invention only by one connection, by fiber cable 13, copper cable 13, coaxial cable 13, by radio way 12, or by a combination of these 13 and 12. The intelligent base station can have n connection interfaces. If needed joints may be used at the connections. The second intelligent base station 11 is structurally identical to the first base station 1. The interface 3 to a special purpose network (e.g. EUROCOM) is marked in FIG. 1.

The network according to the invention does not include Master or HUB-type nodes, but in principle all intelligent base stations are identical and work identically depending on their configuration or use. According to one embodiment the base station network according to the invention can also accept a master-slave type structure. Then the central functions 10 can be taken care of in another intelligent base station 1 and for example the connection interface 3 (e.g. EUROCOM) is at another intelligent base station 11. Also for example the user operation functions can be situated in only one intelligent base station. This mode of operation is useful for example in situations where one intelligent base station is damaged to some extent.

The intelligent base station is preferably situated in the base station mast 1, whereby the antenna cables 7 are very short, or in the immediate proximity of the mast 11, whereby the antenna cables are longer 8. The intelligent base stations in the masts can be connected to the intelligent base stations on the ground for example by optical or some corresponding fast connection 13. Intelligent base stations are preferably connected to each other by radio 12, but other possibilities are fiber or copper connections 13 running on the ground.

Networks formed by intelligent base stations verify one another and different verifications can be created flexibly when needed. The verifications work e.g. on IP-level and MPLS-level, or at a program structure holding the same functions, whereby it can be ensured how the IP-networks are best implemented for each use effectively, safely and economically.

From the network formed by several intelligent base stations, user groups may segregate forming separate mobile MESH-type network acting as an ad hoc-type independent entity. The group may rejoin the original fixed entity with the help of some user device at the user end base station or at some other part of the network entity forming an independent entity with the network.

The intelligent base station has built-in defined IP-areas 4. In different frequency areas 6, different IP-definitions are used, whereat different frequency areas are controlled with an intelligent base station of the invention. Among other things, different radio systems can be controlled by these functions using one intelligent base station. Also the communication between the base stations can be included in the same intelligent base station, so no separate link between these is needed (compare with Minilink).

According to the invention an operator-specific device recognition register function can be placed in the intelligent base station, which register function checks the acceptability (for example ER) of the terminal device. The terminal device is checked for example by its terminal device password (MBI) and the MAC-address or the like. Also the central recognition functions, which control the secret recognition keys of the terminal device subscriber, can be placed in the intelligent base station. The devices belonging to the network to be formed can thus be determined beforehand. Thus disturbing activity of parasite devices in the network can be prevented and a desired level of data security can be achieved. All provided services may easily be edited according to the needs of the user, for example by connecting them to the user's profile.

The intelligent base station includes base station control functions (compare to BSC) that comprise the central control logic of the base station system. It controls for example forming of calls, signaling and maintenance fictions in the radio part of the network. The controller adapts the speech and data transmission to the speech and data channels used by the central and the base stations. According to the invention the controller is adapted together with the terminal device central to the intelligent base station.

The base station series one area and consists of one or more transceiver units. The role of the base station is to encode speech and data, maintain radio connections with the terminal device, to control frequency hopping when in use and encryption and decryption of radio paths. In an intelligent base station according to the invention, a handover and roaming technique based on the quality of the used connection is provided in order to serve the mobile user in the best possible way.

The intelligent base station has home register functions (compare with BLR), which include basic information about the subscriber, such as right of use and facility information. When the user arrives at the area of the terminal device central, the terminal device registers in its visitor register (compare with VLR). Then the terminal device central retrieves the information from the home register of the subscriber and sends them to the visitor register of its own area and updates the position data of the subscriber at the same time. According to the invention this is accomplished in a decentralized mode, so that each base station knows from which register the aspired number is to be found. A separate information server can though easily be externally connected to an intelligent base station network, if desired.

The intelligent base station can also comprise central use and maintenance functions (compare with OMC), with which the base station and connection system is monitored. When desired the facility registers and sends information about faults and alarms. Its functions also comprise maintenance of the subscriber and transmission databases, making of system configurations, addressing of radio resources and surveillance and gathering and handling of measurement data. Each intelligent base station can comprise for example wireless access to the control central, whereby the intelligent base station network can be controlled from any location in the area of the network.

According to the invention the intelligent base stations can have terminal device central functions (compare to MSC, mobile services switching center), which performs all the connection functions for all the terminal devices in the area it controls. The central functions also consider the movement of the subscriber and perform number analysis, routing and connection of the call. The central functions adapt the call for example to public networks, monitors and disconnects the call and provides the billing information to the subscriber database.

The invention claimed is:

1. A mobile apparatus adapted to function with several radio systems for sending, receiving and handling of data in a telecommunications network, said apparatus comprising:
   channeling means for a radio system for controlling a channel as well as a network control service and a surveillance service, and
   profiling means for identifying a user based on a user profile; and
   data security means for providing the user with a secure data connection, fast authentication and/or authorization service, and enables the corresponding services to a mobile user;
   wherein the network control service is a protocol modification and adaptation service;
   wherein in the channeling means, data security means, network control service, surveillance service and profiling means are situated in a same mobile physical device;
   wherein the surveillance service controls and surveys the capacity used by the user;
   wherein the apparatus is adapted to function with several radio systems; and
   wherein the apparatus is configured to:
      disconnect from an original network,
      connect and operate as a device forming its own mobile MESH-type network, and
      rejoin the original network, forming an autonomic entity with the network.

2. The apparatus according to claim 1, wherein the network control service controls the traffic and the load of the network.

3. The apparatus according to claim 1, wherein the network control service is a transmit and switching service for both data and speech.

4. The apparatus according to claim 1, wherein the apparatus comprises at least one external interface.

5. The apparatus according to claim 1, wherein the data is images, moving images, speech, text or a combination of these.

6. A telecommunications network comprising at least one base station and a radio connection to a terminal device, wherein the network comprises a functional entity, located in substantially the same area, configured to send, receive and handle data in the telecommunications network, said functional entity comprising:
   radio system channeling means for controlling a channel as well as a network control function and a monitor function,
   profiling means for identifying a user based on a user profile, and
   data security means for providing the user with a secure data connection, fast authentication and/or authorization function and enables corresponding functions to a mobile user;
   wherein the network-control function is a protocol modification function,
   wherein the radio system channeling means, data security means, and profiling means are situated in a same mobile physical device,
   wherein the monitor function controls and surveys the capacity used by the user,
   wherein the functional entity is adapted to function with several radio systems, and
   wherein said functional entity is configured to:
      disconnect from an original network,
      connect and operate as a device forming its own mobile MESH-type network, and rejoin the original network, forming an autonomic entity with the network.

7. The network according to claim 6, wherein the network control function controls the traffic and load of the network.

8. The network according to claim 6, wherein the network control function comprises a transmission and switching service function for data and speech.

9. The network according to claim 6, wherein the function entity comprises at least one external interface to another identical network and/or to a traditional network.

10. The network according to claim 6, wherein the functional entity is a base station.

11. The network according to claim 6, wherein the functional entity is a terminal device.

12. The network according to claim 6, wherein the functional entity is a single physical device.

13. The network according to claim 6, wherein the network has a control connection using air paths.

14. The network according to claim 6, wherein the function entity adapts different telecommunications systems to each other.

15. The network according to claim 6, wherein the network functions as part of a radio telephone network system.

16. The network according to claim 6, wherein the telecommunications network is an independent telecommunications network.

17. The network according to claim 6, wherein the data is images, moving images, speech, text or a combination of these.

18. A data transmission system, wherein the system comprises a functional entity situated in substantially the same area, for sending, receiving and handling of data in a telecommunications network, the functional entity comprising:
- channeling means for a radio system for controlling a channel, and network controlling and monitoring functions,
- profiling means for identifying a user based on a user profile,
- control means for transmitting and switching data and speech, and
- data security means for providing the user with a secure data connection, fast authentication and/or authorization service, and enables the corresponding functions to a mobile user,
- wherein said channeling means, data security means, profiling means and control means are situated in a same mobile physical device,
- wherein the monitoring function controls and surveys the capacity used by the user,
- wherein the functional entity is adapted to function with several radio systems, and
- wherein said functional entity is configured to:
  - disconnect from an original network,
  - connect and operate as a device forming its own mobile MESH-type network, and
  - rejoin the original network, forming an autonomic entity with the network.

19. A mobile apparatus adapted to function with several radio systems for sending, receiving and handling of data in a telecommunications network, said apparatus comprising:
- channeling means for a radio system for controlling a channel as well as a network control service and a surveillance service, and
- profiling means for identifying a user based on a user profile; and
- data security means for providing the user with a secure data connection, fast authentication and/or authorization service, and enables the corresponding services to a mobile user;
- wherein the network control service is a protocol modification and adaptation service;
- wherein in the channeling means, data security means, network control service, surveillance service and profiling means are situated in a same mobile physical device;
- wherein the surveillance service controls and surveys the capacity used by the user;
- wherein the apparatus is adapted to function with several radio systems; and
- wherein the apparatus is configured to:
  - disconnect from an original network,
  - connect and operate as a second network, and
  - rejoin the original network, forming an autonomic entity with the network.

20. A mobile apparatus adapted to function with several radio systems for sending, receiving and handling of data in a telecommunications network, said apparatus comprising:
- channeling means for a radio system for controlling a channel as well as a network control service and a surveillance service, and
- profiling means for identifying a user based on a user profile; and
- data security means for providing the user with a secure data connection, fast authentication and/or authorization service, and enables the corresponding services to a mobile user;
- wherein the network control service is a protocol modification and adaptation service;
- wherein in the channeling means, data security means, network control service, surveillance service and profiling means are situated in a same mobile physical device;
- wherein the surveillance service controls and surveys the capacity used by the user;
- wherein the apparatus is adapted to function with several radio systems; and
- wherein the apparatus is configured to:
  - disconnect from an original network,
  - connect and operate as part of another network, and
  - rejoin the original network, forming an autonomic entity with the network.

* * * * *